US012735978B2

(12) United States Patent
Donzier et al.

(10) Patent No.: US 12,735,978 B2
(45) Date of Patent: Sep. 15, 2026

(54) MEASURING WATER LEVEL IN HIGHLY DEVIATED OR HORIZONTAL HYDROCARBON WELL SECTIONS

(71) Applicant: OPENFIELD, Versailles (FR)

(72) Inventors: Eric Donzier, Bercheres sur Vesgre (FR); Linda Abbassi, Katy, TX (US); Emmanuel Tavernier, Paris (FR)

(73) Assignee: OPENFIELD, Versailles (FR)

( * ) Notice: Subject to any disclaimer, the term of this patent is extended or adjusted under 35 U.S.C. 154(b) by 526 days.

(21) Appl. No.: 18/141,433

(22) Filed: Apr. 30, 2023

(65) Prior Publication Data

US 2023/0349285 A1 Nov. 2, 2023

(30) Foreign Application Priority Data

Apr. 30, 2022 (FR) ...................................... 2204114

(51) Int. Cl.

*G01F 23/263* (2022.01)
*E21B 47/01* (2012.01)
*E21B 47/017* (2012.01)
*E21B 47/047* (2012.01)

(52) U.S. Cl.

CPC ............ *E21B 47/047* (2020.05); *E21B 47/01* (2013.01); *E21B 47/017* (2020.05); *G01F 23/265* (2013.01)

(58) Field of Classification Search

CPC ...... E21B 47/01; E21B 47/017; E21B 47/047; G01F 23/265

See application file for complete search history.

(56) References Cited

U.S. PATENT DOCUMENTS 4,441,362 A 4/1984 Carlson
5,574,263 A * 11/1996 Roesner .................. E21B 47/10 166/250.11
5,633,470 A * 5/1997 Song ......................... G01F 1/74 73/861.04
6,829,928 B2 * 12/2004 Milone ................. E21B 47/047 73/299
7,114,386 B1 * 10/2006 Veignat ................... E21B 47/10 73/152.29
2006/0107736 A1 * 5/2006 Cens ....................... E21B 47/10 356/28
2016/0013093 A1 1/2016 Chou et al.
2018/0003027 A1 * 1/2018 Donzier .................. E21B 47/10
2020/0020919 A1 1/2020 Makino
2022/0075088 A1 * 3/2022 Beard ...................... E21B 47/00
2022/0228447 A1 * 7/2022 Donzier .................. E21B 47/01

* cited by examiner

*Primary Examiner* — Jill E Culler

(74) *Attorney, Agent, or Firm* — Pehr B. Jansson

(57) ABSTRACT

A production logging tool comprises an elongated cylindrical body of longitudinal axis, the body carrying an articulated dual arms deploying arrangement comprising two deploying arms, the deploying arms being operable from a retracted configuration into a vertically extended configuration. At least one arm carries a segmented water level capacitance probe comprising multiple water level capacitance sensors sensitive to a water content of a multiphase fluid mixture flowing in a hydrocarbon well. The water level capacitance sensors are positioned along the arm such as to be positioned at different height from a bottom to a top of a highly deviated or horizontal section of the hydrocarbon well.

12 Claims, 8 Drawing Sheets

[Fig. 1]
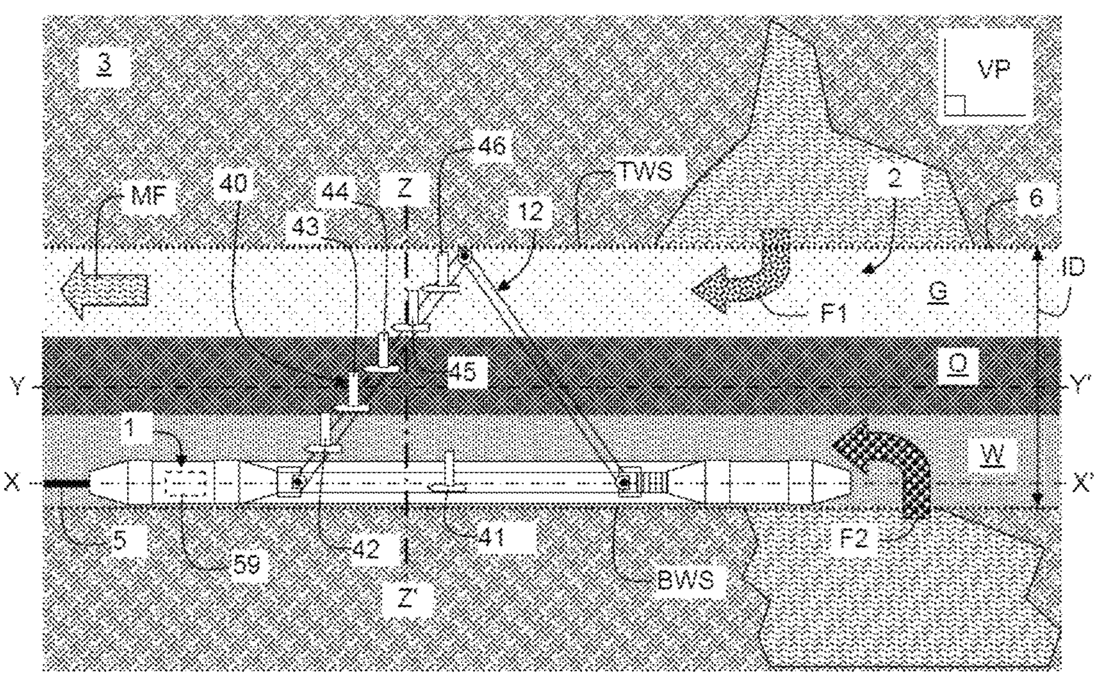

[Fig. 2]

[Fig. 3]
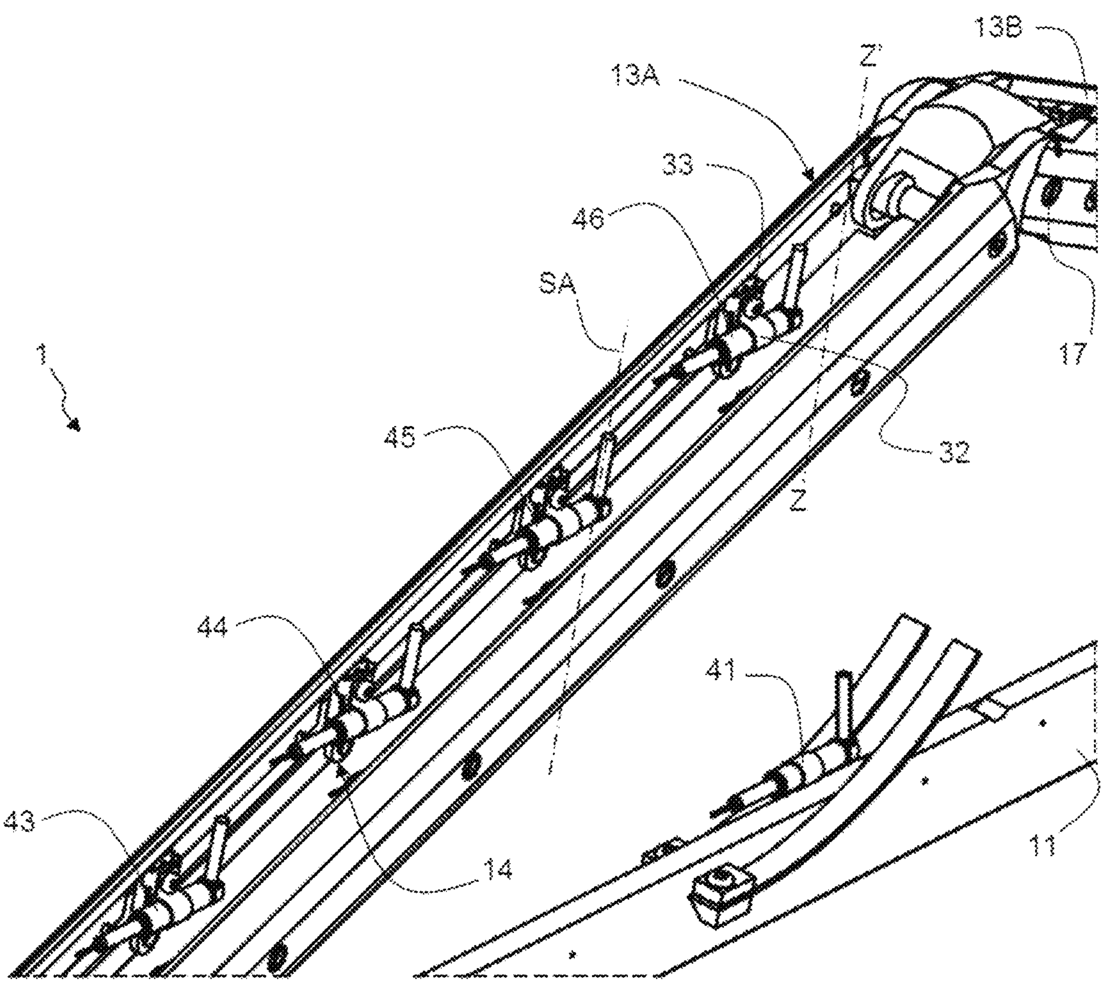
[Fig. 4]
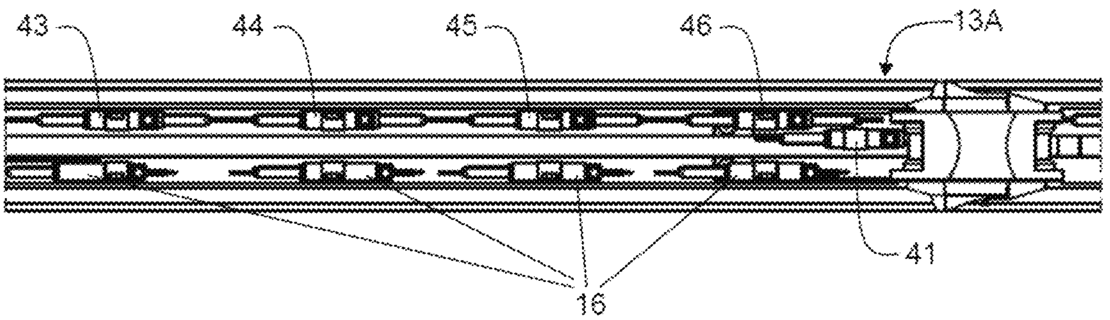

[Fig. 5]
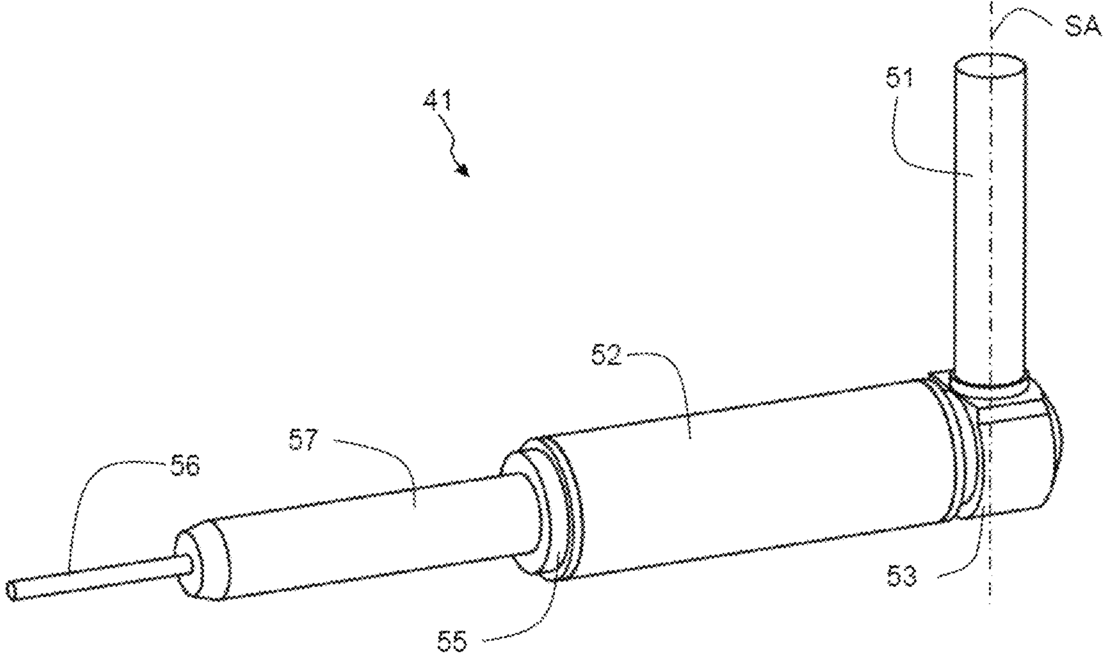
[Fig. 6]
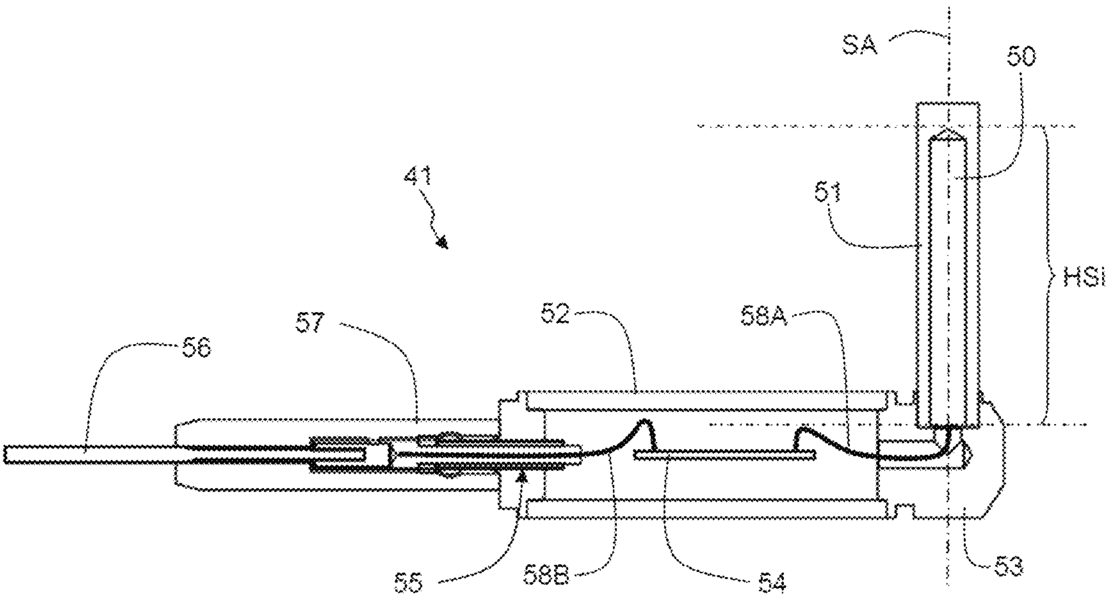

[Fig. 7]
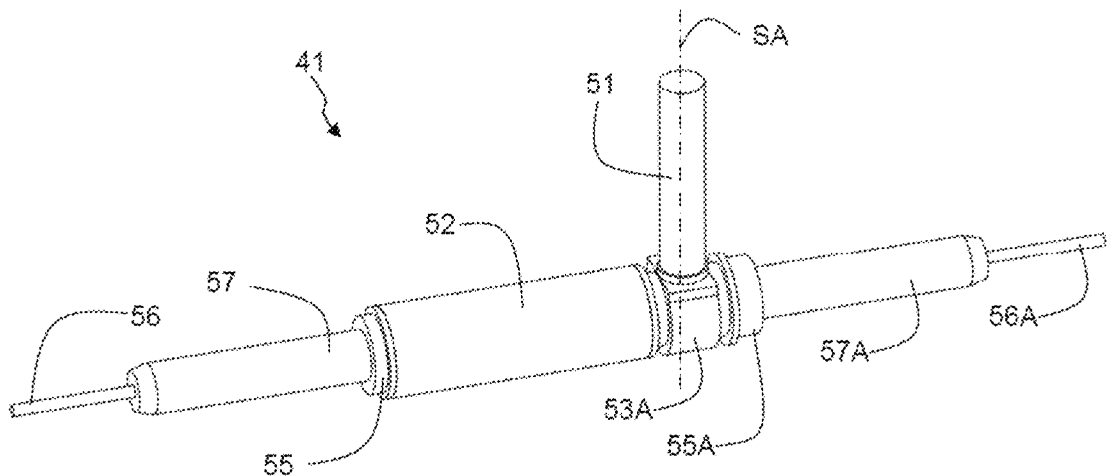
[Fig. 8]
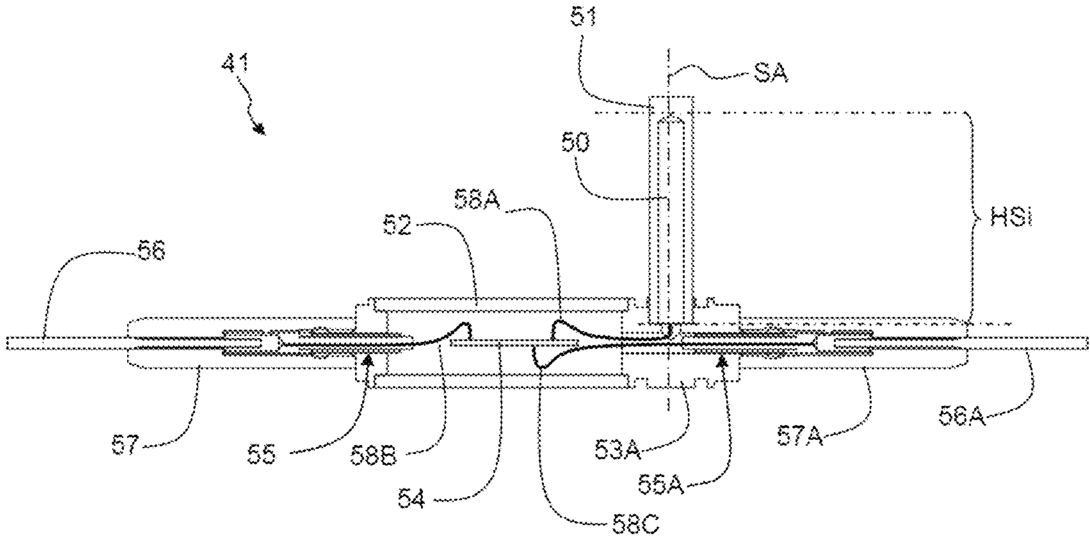

[Fig. 9]
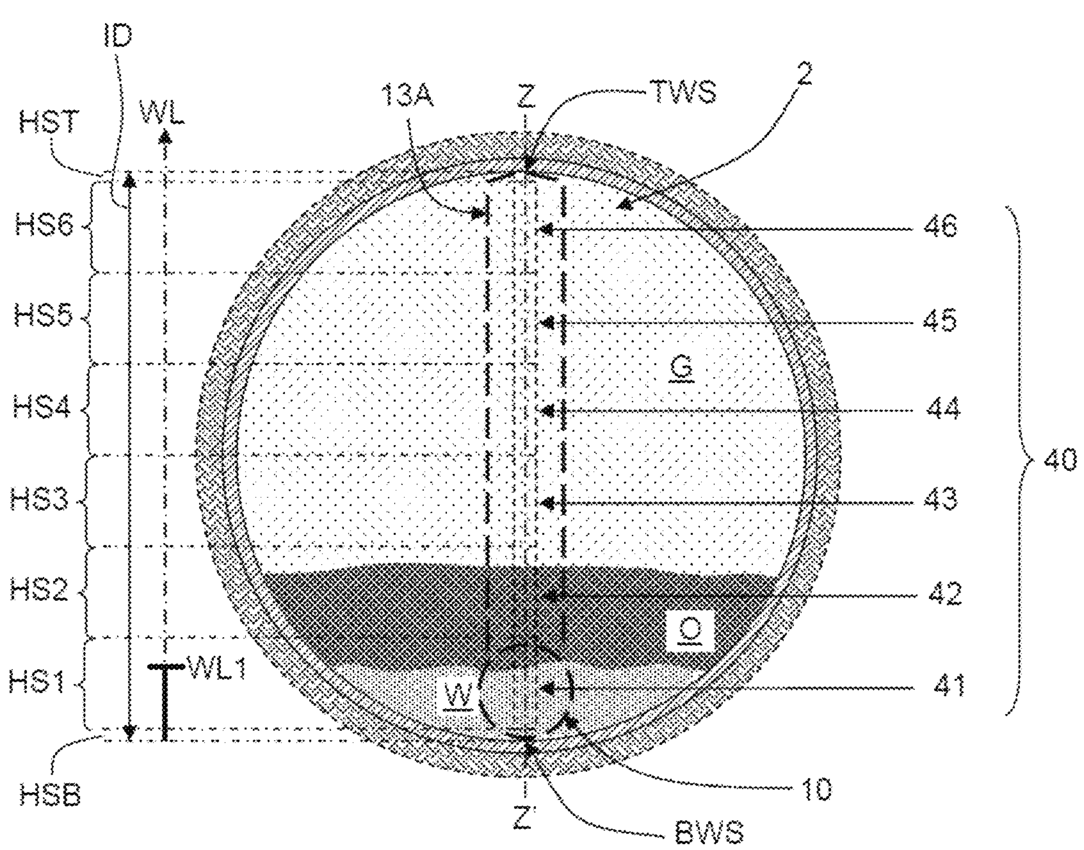

[Fig. 10]
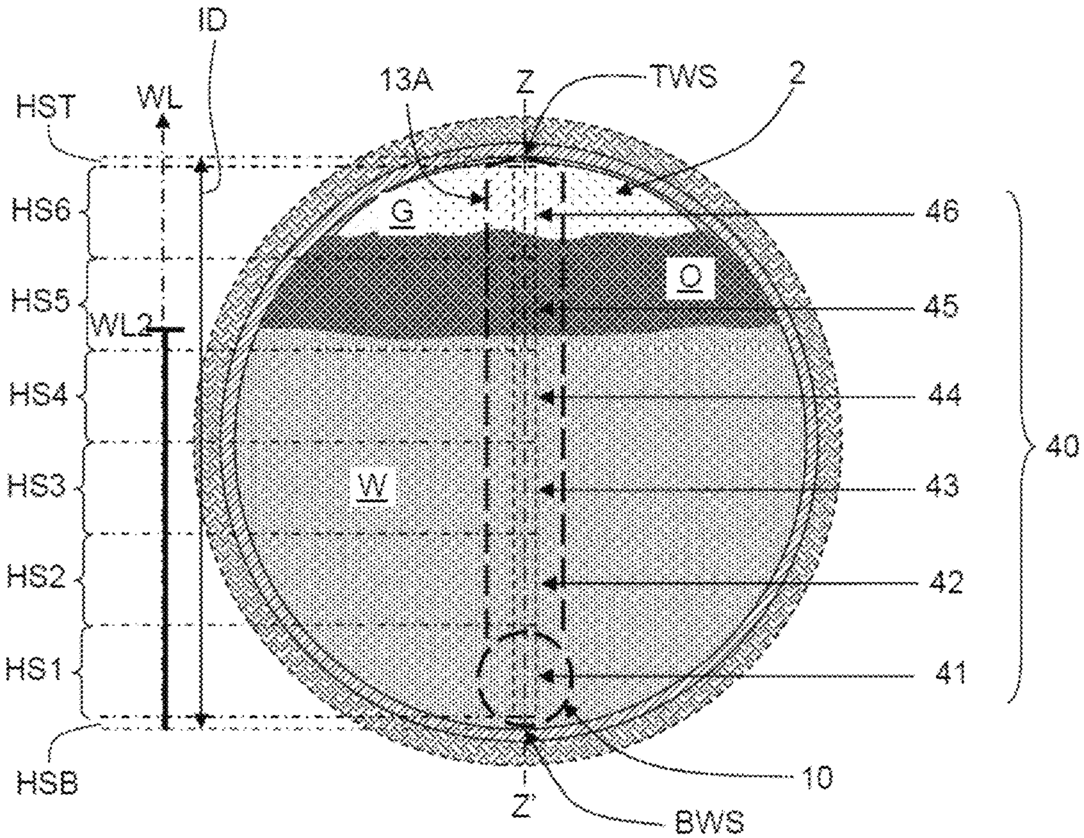
[Fig. 11]
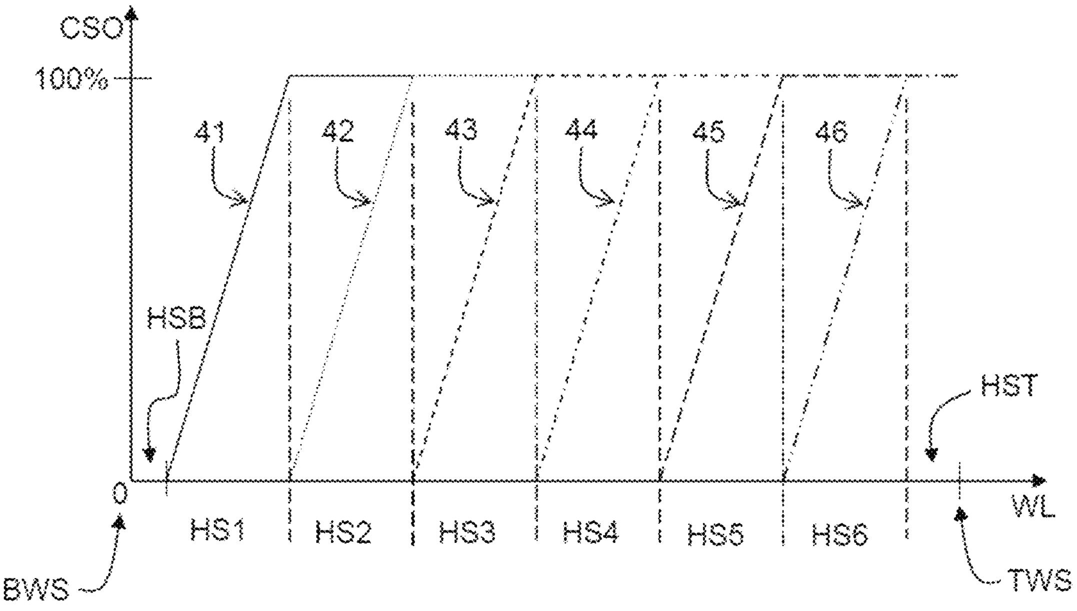

[Fig. 12]
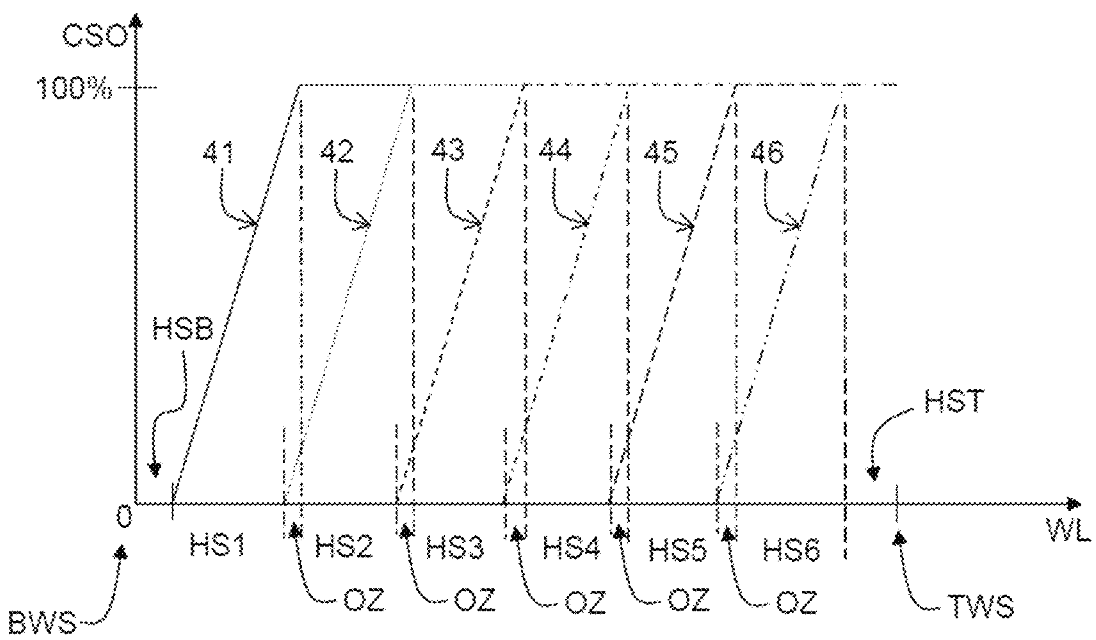
[Fig. 13]
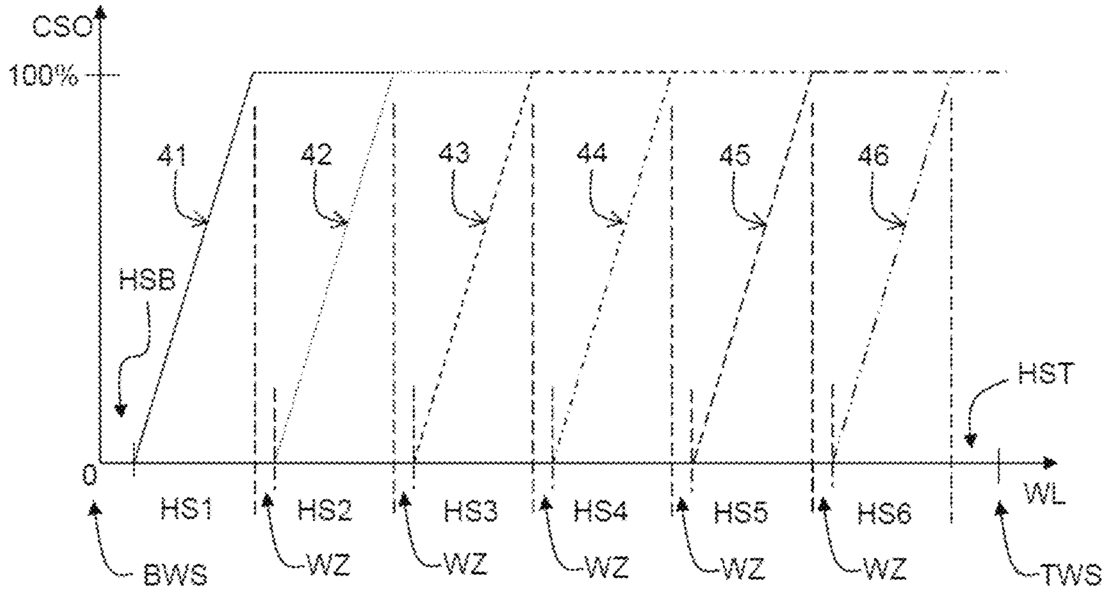

MEASURING WATER LEVEL IN HIGHLY DEVIATED OR HORIZONTAL HYDROCARBON WELL SECTIONS

TECHNICAL FIELD

The invention relates to a production logging tool comprising a water level measurement probe for highly deviated or horizontal wells. Such a production logging tool is used to analyze a multiphase fluid mixture flowing from a hydrocarbon bearing zone into a hydrocarbon well. Such a production logging tool is particularly adapted to be deployed in a hydrocarbon well comprising highly deviated well sections, substantially horizontal well sections or a combination of the above. Production logging tools typically operate in the harsh downhole environment of hydrocarbon wells at downhole pressure (typically in the range of one hundred to 2000 bars) and temperature (typically in the range of 50 to 200° C.) conditions, and in possibly corrosive fluids.

BACKGROUND

During the production of a hydrocarbon well, it is necessary to monitor various characteristic parameters, like the relative volumetric flow rates of the different phases (e.g. oil, gas and water) of the multiphase fluid mixture flowing into the pipe of the well from the hydrocarbon bearing zones. Further, current hydrocarbon wells often comprise a vertical well section, deviated well sections, highly deviated well sections and even substantially horizontal well sections. The interpretation of the flow in such complex wells is challenging because small changes in the well deviation and the flow regime influence the flow profile. Thus, an accurate monitoring requires sensors or probes capable of imaging a surface section or a volume section of the pipe and providing an estimation of the surface section or the volume section occupied by each phase.

Production logging of hydrocarbon wells (e.g., oil and gas wells) has numerous challenges related to the complexity of the multiphasic flow conditions and the harshness of the downhole environment.

Gas G, oil O, water W, mixtures O&W flowing in wells, being either openhole or cased hole wells, will present bubbles, droplets, mist, segregated wavy, slugs structures depending on the relative proportions of phases ("holdup"), their velocities, densities, viscosities, as well as pipe dimensions and well deviations. In order to achieve a good understanding of the individual phases flowrates and determine the relative contributions of each zone along the well, an accurate mapping of fluids types and velocities is required over the whole section of the hole (openhole well portion) or pipe (cased well portion) at different depths (i.e., the measured depth is different from the true vertical depth and generally longer than true vertical depth, due to deviations in the well from the vertical).

Further, production issues greatly vary depending on reservoir types and well characteristics resulting in the need for a flexible production logging technology working with different types of sensing physics. For example, due to the phases segregation, deviated wells showing high water cuts require an accurate detection of thin oil layer at the uppermost portion of the pipe. Well deviation will have a strong impact on velocities and holdups.

Furthermore, high pressure, up to 2000 bars, high temperature, up to 200° C., corrosive fluid ($H2S$, $CO2$) put constraints on sensors and tool mechanics.

Furthermore, solids presence in flowing streams can damage equipment. In particular, the sand entrained from reservoir rocks will erode parts facing the fluid flow. Solids precipitated from produced fluids due to pressure and temperature changes, such as asphalthenes, paraffins or scales create deposits contaminating sensors and/or blocking moving parts (e.g., spinners).

Furthermore, the tool deployment into the well can be difficult and risky. In highly deviated or horizontal wells, tools must be pushed along the pipe using coiled tubing or pulled using tractor which is difficult when tools are long and heavy. Pipes may be damaged by corrosion or rock stress which may create restrictions and other obstacles. During the logging operation, equipment can be submitted to high shocks. Thus, in such environments, it is highly preferable to have light and compact tools.

Furthermore, the cost is also an important parameter in order to provide an economically viable solution to well performance evaluation even in mature fields having low producing wells in process of depletion with critical water production problems.

Furthermore, measuring multiphase flow in highly deviated well sections and substantially horizontal well sections (well axis YY') requires to resolve a layered flow within the well sections. State of the art techniques rely on the deployment of an array of local sensors within the section of the hydrocarbon well. In a context of fully segregated flows G/O/W, an axial configuration (more precisely the vertical direction—i.e., according to earth gravity vector—passing through the well axis YY') achieves the best spatial resolution. A part of Petro-physicist community has expressed a preference for such an axial configuration of measurements in such a context.

With respect to the hereinbefore described challenges, the state-of-the-art production logging tools, as described in document U.S. Pat. No. 5,633,470 have limitations. This document describes a method of determining volumetric flow rates of gas and liquid in a highly inclined conduit. The method includes measuring the velocity the gas, measuring the velocity of the liquid, calculating a fractional amount of the cross-sectional area of the conduit occupied by the gas and occupied by the liquid, and calculating the volumetric flow rates from the measurements of velocity and from the calculated fractional amounts of the cross-sectional area of the conduit occupied by the gas and by the liquid. The gas velocity is measured by cross-correlating measurements of two spaced apart temperature sensors after momentarily heating the gas. The liquid velocity is measured by a spinner flowmeter. The liquid level is measured by a capacitance sensor arm pivotally attached to a production logging instrument. The sensor arm is pivotally attached so that it radially extends from the tool substantially in the same direction as the gas velocity sensor housing. The sensor arm can include a mechanism for selectively radially extending the sensor arm so that it contacts the upper wall of the wellbore. The sensor arm includes an electrically insulating surface upon which are disposed two parallel electrodes extending substantially the entire length of the arm. The electrodes are electrically connected to a circuit in the tool which generates a signal proportional to the capacitance between the electrodes. The capacitance between the electrodes depends on the dielectric properties of the fluid in contact with the electrodes. The liquid, which is likely to comprise at least a slight fractional volume of water, typically has substantially different dielectric properties than the gas. The capacitance between the electrodes is directly related to the liquid level in the wellbore.

Such a capacitance sensor is not satisfactory because the electrodes extend substantially the entire length of the arm, at an angle, and provide a continuous measurement. This may lead to incorrect measurements, resulting in poor measurement quality and even measurement errors in the determination of the water level.

SUMMARY OF THE DISCLOSURE

It is an object of the invention to propose a production logging tool that overcomes one or more of the limitations of the existing apparatus, in particular that is structurally simple and reliable to operate whatever the downhole conditions. Further, it is also a specific object of the invention to perform water level diagnostics in horizontal wells with an important accuracy/resolution, with particular focus on highly deviated and horizontal hole (openhole well portion) or pipe (cased well portion).

According to one aspect, there is provided a production logging tool comprising an elongated cylindrical body of longitudinal axis, the body carrying an articulated dual arms deploying arrangement comprising two deploying arms coupled together, to the body and to a sliding sleeve, the deploying arms being operable from a retracted configuration into a vertically extended configuration, wherein:

- at least one arm carries a segmented water level capacitance probe comprising multiple water level capacitance sensors sensitive to a water content of a multiphase fluid mixture flowing in a hydrocarbon well;
- the water level capacitance sensors are positioned along the arm such as to be positioned at different height from a bottom to a top of a highly deviated or horizontal section of the hydrocarbon well;
- each water level capacitance sensor comprising a conductive body forming an electrode covered by a protective cap forming an insulator extending substantially vertically along a height segment such that the segmented water level capacitance probe substantially covers an internal diameter of said section of the hydrocarbon well, and such that a capacitance sensing part axis of the electrode and the insulator is substantially perpendicular to the longitudinal axis for any opening of the deploying arms from the retracted configuration to the vertically extended configuration in said section of the hydrocarbon well.

The articulated dual arms deploying arrangement may further comprise a pantographic mechanism coupling each water level capacitance sensor to said, at least one, deploying arm.

Each water level capacitance sensor may further comprise an electronics board fitted within a sheath forming a sealed housing and a first isolated in/out wire connected to said electronics board by a first high pressure electrical feedthrough, the protective cap forming the insulator being coupled in a sealed manner to the sheath through a hollow capacitance sensing part support, the conductive body forming the electrode being internally connected to said electronics board via an internal connection wire.

The production logging tool may further comprise a modified hollow capacitance sensing part support comprising a T-shaped cavity and coupling to a second high-pressure electrical feedthrough, and a second isolated in/out wire connected to the electronics board by said second high-pressure electrical feedthrough and arranged to connect to an adjacent water level capacitance sensor.

The conductive body forming the electrode and the protective cap forming the insulator may be coaxial and have a cylindrical shape extending perpendicularly to the longitudinal axis.

The sheath forming the sealed housing, said high pressure electrical feedthrough, and said capacitance sensing part support may have a cylindrical shape extending parallelly to the longitudinal axis.

The multiple water level capacitance sensors may be connected together to a main processing module such as to form an array of sensors.

The array of sensors may form a star of water level capacitance sensors, or a string of water level capacitance sensors.

At least one arm may further carry additional sensors comprising phases identification sensors, or local velocity measurements sensors, or a combination of both.

According to a further aspect, there is provided a water level measuring method in a highly deviated or horizontal section of a hydrocarbon well comprising the steps of:

- providing a production logging tool in the hydrocarbon well, the production logging tool comprising an elongated cylindrical body of longitudinal axis, the body carrying an articulated dual arms deploying arrangement comprising two deploying arms coupled together, to the body and to a sliding sleeve, the deploying arms being operable from a retracted configuration into a vertically extended configuration, wherein:
- at least one arm carries a segmented water level capacitance probe comprising multiple water level capacitance sensors sensitive to a water content of a multiphase fluid mixture flowing in the hydrocarbon well;
- the water level capacitance sensors are positioned along the arm such as to be positioned at different height from a bottom to a top of the highly deviated or horizontal section of the hydrocarbon well;
- each water level capacitance sensor comprising a conductive body forming an electrode covered by a protective cap forming an insulator extending substantially vertically along a height segment;
- running the production logging tool along the hydrocarbon well while operating the deploying arms to vertically extend into engagement with a wall of the hydrocarbon well, said articulated dual arms deploying arrangement being configured such that a capacitance sensing part axis of the electrode and the insulator is substantially perpendicular to the well axis for any vertical extension of the deploying arms when running the production logging tool along the hydrocarbon well so that the segmented water level capacitance probe substantially covers an internal diameter of said section of the hydrocarbon well;
- determining the water level in said section of the hydrocarbon well based on signals proportional to the capacitance measured by each water level capacitance sensor and related to a local water level along said height segment all along the arm carrying the segmented water level capacitance probe.

The water level measuring method may further comprise the steps of calculating a water level average for an overlapping height portion where two signals measured from adjacent water level capacitance sensors are available in a corresponding overlapping height segment.

The water level measuring method may further comprise the steps of calculating a water level interpolation for an uncovered height portion where signals measured from adjacent water level capacitance sensors are unavailable in a corresponding unmeasured height segment.

The production logging tool of the invention enables deploying an array of local water level measurement sensors along the vertical axis of a horizontal well section. Each local sensor enables measuring the water content of the multiphase fluid mixture flowing in the hydrocarbon well, and, thus, the water level with a very good resolution. The water level measurement according to the invention results in a simple and compact structure achieving low cost, easy operation and maintenance.

Other advantages will become apparent from the hereinafter description of the invention.

BRIEF DESCRIPTION OF THE DRAWINGS

The present invention is illustrated by way of examples and not limited to the accompanying drawings, in which like references indicate similar elements:

FIG. 1 is a side partial cross-sectional view illustrating a production logging tool comprising a segmented water level capacitance probe of the invention within a horizontal well section in a fully deployed configuration;

FIG. 2 is a one side perspective view of a particular embodiment of the production logging tool comprising the segmented water level capacitance probe of the invention in a deployed configuration;

FIG. 3 is an enlarged perspective view of a detailed zone of FIG. 2 of the particular embodiment depicted in FIG. 2;

FIG. 4 is a top view of the enlarged view depicted in FIG. 3;

FIG. 5 and FIG. 6 are, respectively, a one side perspective view and a side cross-sectional view illustrating a first embodiment of a water level capacitance sensor of the segmented water level capacitance probe of the invention;

FIG. 7 and FIG. 8 are, respectively, a one side perspective view and a side cross-sectional view illustrating a second embodiment of a water level capacitance sensor of the segmented water level capacitance probe of the invention;

FIG. 9 and FIG. 10 are cross-sectional views schematically illustrating the segmented water level measurement principle of the invention in a horizontal section of a hydrocarbon well, further depicting said section with two different water levels, respectively;

FIG. 11, FIG. 12 and FIG. 13 are diagrams illustrating typical signals measured with the segmented water level capacitance probe of the invention and used to implement various embodiments of the water level measurement method of the invention for various inner diameters of the hydrocarbon well section, respectively.

DETAILED DESCRIPTION

FIG. 1 illustrates a downhole tool, for example a production logging tool 1 being deployed into a wellbore of a hydrocarbon well 2 that has been drilled into a subterranean formation 3. In this particular example, the downhole tool is deployed in a horizontal section of a hydrocarbon well that has been further fractured at defined locations (i.e. fracture clusters). The production logging tool 1 is used to analyze at least one property of a multiphase flow mixture MF flowing in the hydrocarbon well 2. The multiphase flow mixture MF is characterized by holdup, slippage velocity and phase segregation. Holdup is the percentage by volume of the gas, oil and/or water content in the wellbore measured over a cross-sectional area (based on the wellbore inner diameter ID). Slippage velocity is the relative velocity existing between light phases and heavy phase (light phases move faster than heavier phases). Phase segregation is the tendency of fluids to stratify into different layers because of differences in density between oil O, water W and gas G and due to the immiscibility of water and oil, and the limited miscibility (depending on temperature and pressure) of gas in oil and water. The wellbore refers to the drilled hole or borehole, including the open hole or uncased portion of the well. The borehole refers to the inside diameter of the wellbore wall, the rock face that bounds the drilled hole. The open hole refers to the uncased portion of a well. While most completions are cased, some are open, especially in horizontal or highly inclined wells where it may not be possible to cement casings efficiently. The production logging tool 1 is suitable to be deployed and run in the wellbore of the hydrocarbon well 2 for performing various analysis of the multiphase flow mixture MF properties irrespective of a cased or uncased nature of the hydrocarbon well. The production logging tool 1 may comprise various subsections having different functionalities and may be coupled to surface equipment through a wireline 5 (or alternative equipment such as coiled tubing) which is operable at a surface equipment to displace the tool along the well. At least one subsection comprises a measuring device generating measurements logs, namely measurements versus depth or time, or both, of one or more physical quantities in or around the well 2. Wireline logs are taken downhole, transmitted through the wireline 5 to surface and recorded there, or else recorded downhole and retrieved later when a logging instrument is brought to surface. There are numerous log measurements (e.g. electrical properties including conductivity at various frequencies, sonic properties, active and passive nuclear measurements, dimensional measurements of the wellbore, formation fluid sampling, formation pressure measurement, flow rate measurements, etc. . . . ) possible while the production logging tool 1 is displaced along and within the hydrocarbon well 2 drilled into the subterranean formation 3. Ancillary surface equipment is neither shown nor described in detail herein. In the following, the wall of the wellbore irrespective of its cased (cement or pipe) or uncased nature is referred to wall 6. Various fluid (that may include solid particles) entries F1, F2 may occur from the subterranean formation 3 towards the wellbore 2. Once in the wellbore 2, these fluid entries form the multiphase flow mixture MF that generally flows towards the surface. In particular, in deviated or highly deviated or horizontal wells, the multiphase fluid mixture MF may be segregated. In a particular example, the segregated multiphase flow mixture MF may flow as a layer of gas G above a layer of oil O, further above a layer of water W (possibly an immiscible oil and water mixture) from top of the considered well section TWS to bottom of the considered well section BWS (i.e. the vertical axis ZZ', in the direction of earth gravity).

Figure 2:
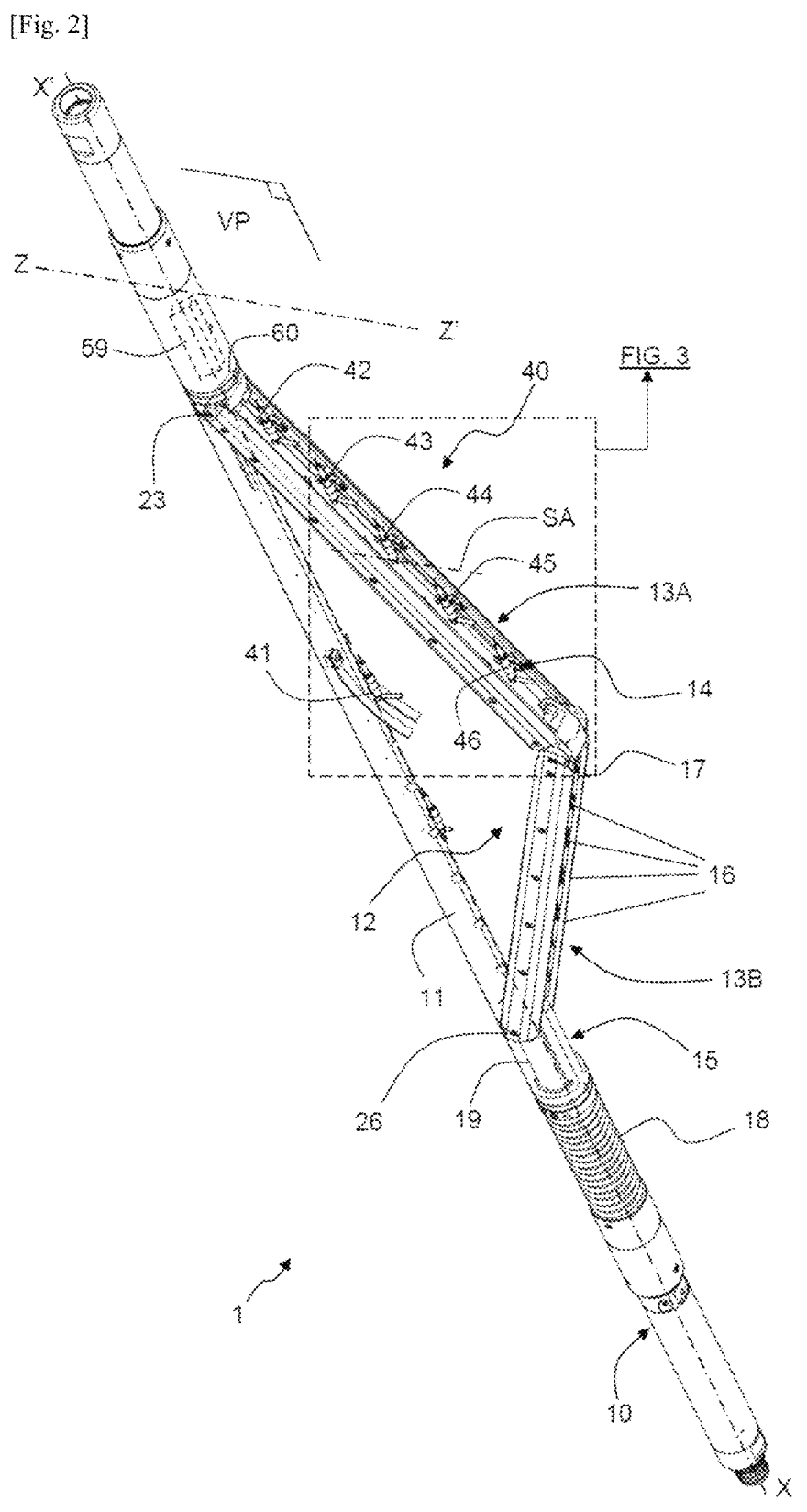

FIG. 2 is a side perspective view, FIG. 3 and FIG. 4 are enlarged views of a detailed zone of FIG. 2 (delimited by a dotted frame), namely a side perspective view and a top view, respectively, schematically illustrating a particular embodiment of a production logging tool 1 of the invention. The production logging tool 1 has an elongated cylindrical shape and comprises a body 10 having a thinned central rigid portion 11 carrying an articulated dual arms deploying arrangement 12. The body 10 of the production logging tool 1 extends longitudinally about the longitudinal axis XX' that is coaxial with the well axis YY'. The body 10 of the production logging tool 1 is sitting at the bottom of the well BWS under its own weight as depicted in FIG. 1. Alternatively, the production logging tool 1 may further comprise or be coupled to an additional weight in order to achieve better sitting, for example by means of a rotating swivel having eccentric weights (not shown). The articulated dual arms deploying arrangement 12 comprises two deploying arms 13A, 13B and a sliding sleeve mechanism 15. The articulated dual arms deploying arrangement 12 may further comprise a pantographic mechanism 14. The deploying arms 13A, 13B are deployed from the body 10 along the vertical axis ZZ' traversing the well section from bottom BWS to top TWS. More precisely, the weight distribution in the production logging tool 1 allows that the production logging tool is sitting at the bottom BWS of the well section with a position and orientation such that the two deploying arms 13A, 13B can extend from the tool body 10 towards the top TWS according to the vertical direction (vertical axis ZZ', i.e. the vertical axis ZZ' is defined by the earth gravity vector) and passing through the well axis YY' (see the measurements configuration depicted in FIG. 1, FIG. 9 and FIG. 10). Optionally, the production logging tool 1 may also comprise a triaxial accelerometer for controlling inclination and relative bearing in order to check whether or not the production logging tool 1 is correctly positioned/deployed in the well section to be measured. The deploying arms 13A, 13B are coupled together through a hinge 17 at an outermost end, one arm 13A is coupled to a first end part of the body 10 through a hinge 23 at another end, and the other arm 13B is coupled to a second end part of the body through a hinge 26 at the sliding sleeve mechanism 15 at another end. The sliding sleeve mechanism 15 may comprise an axial spring 18 extending along the longitudinal axis XX' and being disposed in abutment between the second end part of the body and a sliding sleeve 19. The sliding sleeve mechanism 15 comprising an axial spring 18 is a passive mechanism enabling the deploying arms 13A, 13B to be automatically vertically extended such as to be deployed in the full well diameter and to engage the wall of the well as depicted in FIG. 1. Alternatively, the passive sliding sleeve mechanism 15 may be replaced by an active motorized mechanism, for example a motor (not shown) replacing the spring and controlling the position of the sliding sleeve. An arm opening sensor 60 provides a measurement of the opening of the deploying arms 13A, 13B and makes it possible to infer the inner diameter ID of the well section 2.

One of the deploying arms 13A, 13B is holding a segmented water level capacitance probe 40. The segmented water level capacitance probe 40 comprises multiple water level capacitance sensors sensitive to a water content of the multiphase fluid mixture MF flowing in the hydrocarbon well 2. In the particular embodiment depicted in drawings, the segmented water level capacitance probe 40 comprises the non-limitative number of six water level capacitance sensors 41, 42, 43, 44, 45, 46.

Each deploying arm 13A, 13B may also be holding other types of sensors, hereinafter referenced as additional sensors 16 for example for phases identification and local velocity measurements. Alternatively, only one deploying arm 13A or 13B may be holding said additional sensors 16. Each additional sensor may be fastened by appropriate means on one of the arms, or on both deploying arm 13A, 13B. The additional sensor 16 may include a sensing part, an electronic part and input/output wire so as to provide numerical measurement data, these ancillary sensor components and their operations are neither shown nor described in detail herein. The additional sensors 16 may form an array of sensors of any type or a combination of multiple types including, in a non-limitative manner, micro-spinners used to measure velocity and direction of flow, and/or electrical phases identification sensors.

The articulated dual arms architecture enables a fully open configuration of the production logging tool within the well diameter through the operation of the two deploying arms 13A, 13B and the sliding sleeve mechanism 15. The outermost end of the deploying arms 13A, 13B may contact the wall 6 of the wellbore during measurement operations in the wellbore. In this way, the production logging tool 1 is stabilized in the wellbore section being under measurements. Further, when the production logging tool 1 is moved along the wellbore, the deploying arrangement 12 is automatically adapted to fit through borehole sections of different diameters.

According to a particular embodiment of the invention, the water level capacitance sensors 41, 42, 43, 44, 45, 46 and additional sensors 16 may be attached to the deploying arm 13A, 13B by means of the pantographic mechanism 14 such that each sensor is always perfectly positioned within the flow of multiphase fluid mixture MF to be measured. In particular, each sensor 16, 41, 42, 43, 44, 45, 46 is securely maintain in place to the pantographic mechanism 14 by means of a metal strip 32 and a screw 33. This permits an easy mounting and dismantling. Other way of fastening the sensor to the pantographic mechanism 14, like welding or clipping or insertion in slots may also be possible.

According to an alternative embodiment and as depicted in FIG. 2 and FIG. 3, one water level capacitance sensor referenced 41 may also be supported the thinned central rigid portion 11 of the body 10. Such an embodiment enables positioning the corresponding water level capacitance sensor near the bottom of the well section BWS, at best a closest possible position to the bottom of the well section.

The sensors are deployed in a vertical plane VP passing through the well axis YY'. Thus, an optimal positioning of each sensor 16, 41, 42, 43, 44, 45, 46 along the deploying arm is achieved while deployment of the production logging tool 1 within the hydrocarbon well 2 occurs and causes the production logging tool 1 to follow the changes of internal diameter ID of the hydrocarbon well 2 (cased or openhole).

The water level capacitance sensors 41, 42, 43, 44, 45 and 46 are positioned along one of the deploying arms 13A, 13B such as to be positioned at different height from a bottom BWS to a top TWS of a highly deviated or horizontal section of the hydrocarbon well 2.

FIG. 5 and FIG. 6 are, respectively, a one side perspective view and a side cross-sectional view illustrating a first embodiment of a water level capacitance sensor of the segmented water level capacitance probe of the invention, the first embodiment corresponding to a sensor having a single connection. FIG. 7 and FIG. 8 are, respectively, a one side perspective view and a side cross-sectional view illustrating a second embodiment of a water level capacitance sensor of the segmented water level capacitance probe of the invention, the second embodiment corresponding to a sensor having a double connection. Only the water level capacitance sensor 41 is depicted, the other water level capacitance sensor 42, 43, 44, 45 and 46 have the same constituting parts. The first embodiment and the second embodiment of the water level capacitance sensor only differ from each other in that the first embodiment has a simple connection, while the second embodiment has a double connection.

The water level capacitance sensor 41 according to the first and second embodiments comprises the capacitance sensing part itself, namely a conductive body forming an electrode 50 and a protective cap forming an insulator 51, a sheath 52, a capacitance sensing part support 53, an electronics board 54, a first high-pressure electrical feedthrough 55, a first in/out isolated wire 56, a first cable boot 57 and multiple internal connection wires 58A, 58B.

The capacitance sensing part comprises the conductive body forming an electrode 50 covered by the protective cap forming the insulator 51. The capacitance sensing part, the electrode 50 and the insulator 51 have a cylindrical shape of axis SA and extend substantially vertically along a height segment HSi (the index "i" having a value between 1 and 6 in the example presented in the drawings, namely a height segment HS1 associated with the water level capacitance sensor 41, a height segment HS2 associated with the water level capacitance sensor 42, etc. . . . and a height segment HS6 associated with the water level capacitance sensor 46). The fact that the capacitance sensing part is oriented vertically makes it possible to have a capacitance measurement proportional to the height of water for each local capacitance sensing part as it will be explained hereinafter.

The sheath 52 has a cylindrical shape and extends substantially horizontally, or perpendicular to the capacitance sensing part axis SA. The sheath 52 is closed in a sealed manner, on one side, by the capacitance sensing part support 53 (the modified capacitance sensing part support 53A in the second embodiment), and on the other side by a body of the first high pressure electrical feedthrough 55 such as to form a sealed housing. The electronics board 54 is fitted within the sheath 52 and is isolated from the external environment.

The capacitance sensing part support 53 is supporting the capacitance sensing part extending substantially vertically and coupling the capacitance sensing part to the sheath 52 extending substantially horizontally, in particular the electrode 50 and the insulator 51 to the electronics board 54. The capacitance sensing part support 53 is hollow, comprising a L-shaped cavity, enabling connection of the electrode 50 to the electronics board 54 via the internal connection wire 58A.

The coupling of the water level capacitance sensor 41 to the pantographic mechanism 14 is arranged such that each capacitance sensing part, in particular the electrode 50 and the insulator 51 of each water level capacitance sensor stays substantially perpendicular to the longitudinal axis XX', and the sheath 52 and feedthrough 55 stays substantially parallel to the longitudinal axis XX' of the production logging tool 1 for any opening of the deploying arms 13A, 13B from the retracted configuration to the vertically extended configuration. Thus, the capacitance sensing part axis SA of each water level capacitance sensor always stays substantially parallel to the vertical axis ZZ' (the direction of earth gravity). The detailed constitution and operation of the pantographic mechanism 14 is described in patent application FR2100465 filed by the same Applicant.

The first isolated in/out wire 56 is connected to the electronics board 54 by the high-pressure electrical feedthrough 55 via the internal connection wire 58B.

The first cable boot 57 is fitted onto the high-pressure electrical feedthrough 55 (e.g. either integral or slips on the feedthrough) and a portion of the first in/out isolated wire 56 so as to protect the high-pressure electrical feedthrough on all sides and prevents it from snagging or breaking off the body of the feedthrough on one side and the wire on the other side.

The water level capacitance sensor 41 according to the second embodiment further comprises a modified capacitance sensing part support 53A, a second high-pressure electrical feedthrough 55A, a second in/out isolated wire 56A, a second cable boot 57A and an additional internal connection wire 58C. The modified capacitance sensing part support 53A is hollow, comprising a T-shaped cavity, enabling connection of the electrode 50 to the electronics board 54 via the internal connection wire 58A, and coupling to the second high-pressure electrical feedthrough 55A. The second isolated in/out wire 56A is connected to the electronics board 54 by the high-pressure electrical feedthrough 55A via the internal connection wire 58C.

The electronics board 54 is realized as a printed circuit board comprising electronic components associated with the corresponding capacitance sensing part, namely the electrode 50 and the insulator 51 and determine the level of water along the height segment HSi associated with the corresponding water level capacitance sensor 4*i*. The electrode 50 generates a signal proportional to the capacitance between the electrode 50, the insulator 51 and the surrounding fluid (the multiphase fluid mixture MF). The capacitance depends on the dielectric properties of the fluid in contact with the capacitance sensing part, namely around the insulator 51, taking into consideration that the dielectric properties between water W, oil O, gas G and immiscible water and oil mixture are substantially different such as to be easily distinguishable from each other. Thus, the signal proportional to the capacitance measured by the electronics board 54 typically be directly related to the local water level all along the height segment HSi associated with the corresponding water level capacitance sensor 41 (the same is true for each of the other water level capacitance sensors 42, 43, 44, 45, 46).

Each electronics board 54 is connected via the internal connection wires 58B and the first in/out isolated wire 56 to a main processing module 59 of the production logging tool 1 (visible on FIG. 1 and FIG. 2). The main processing module 59 determines the water level WL in the highly deviated or horizontal section of the hydrocarbon well 2 based on all the local water level measurements performed by the multiple water level capacitance sensors 41, 42, 43, 44, 45, 46 as it will explained hereinafter in relationship with FIG. 9 to FIG. 13. The multiple water level capacitance sensors 41, 42, 43, 44, 45, 46 are connected together to the main processing module 59 such as to form an array of sensors. The water level capacitance sensor according to the first embodiment enables connecting the array of sensors such as to form a star of water level capacitance sensors. The first embodiment improves reliability because all the sensors are independently connected to the main processing module, one faulty electronic board and/or connection having no effect on another one. The water level capacitance sensor according to the second embodiment enables connecting the array of sensors such as to form a string of water level capacitance sensors. The second embodiment simplifies cable connection because all the sensors are connected together to the main processing module via a single chain of connection. A segmented water level capacitance probe 40 may also comprise a combination of water level capacitance sensors according to both embodiment.

FIG. 9 is a cross-sectional view schematically illustrating the segmented water level measurement principle of the invention in a horizontal section of a hydrocarbon well 2, said section having a first water level WL1 being a low water level. FIG. 10 is the same cross-sectional view schematically illustrating a horizontal section of a hydrocarbon well 2 having a second water level WL2 being a high water level. In highly deviated or horizontal well 2, the water level WL is determined from the bottom BWS to the top TWS of the well section. The water level WL measurement is performed by the segmented water level capacitance probe 40 that is deployed in the well section.

The deploying arm 13A of the downhole tool 1 positions the segmented water level capacitance probe 40 such that the water level capacitance sensors 41, 42, 43, 44, 45 and 46 are positioned at different height from a bottom BWS to a top TWS of the highly deviated or horizontal section of the hydrocarbon well 2. Each water level capacitance sensor 41, 42, 43, 44, 45 and 46 extends substantially vertically along a height segment HS1, HS2, HS3, HS4, HS5 and HS6, respectively, such that the segmented water level capacitance probe 40 substantially covers the full height of said section (substantially the internal diameter ID except for distal heights as explained hereinafter). In particular, the water level capacitance sensor 41 is positioned such as to measure the water level in the height segment HS1, the water level capacitance sensor 42 is associated to the height segment HS2, the water level capacitance sensor 43 is associated to the height segment HS3, the water level capacitance sensor 44 is associated to the height segment HS4, the water level capacitance sensor 45 is associated to the height segment HS5 and the water level capacitance sensor 46 is associated to the height segment HS6.

With the first water level WL1 example of FIG. 9, only the water level capacitance sensor 41 provides a signal indicative of the presence of water in the height segment HS1.

With the second water level WL2 example of FIG. 10, the water level capacitance sensor 41, 42, 43, 44 and 45 provide signals indicative of the presence of water in the height segments HS1, HS2, HS3, HS4 and partially HS5.

It is to be noted that due to construction constraints of the tool body 10 sitting at the bottom of the well section BWS and protection of the water level capacitance sensor at the end of the deploying arm close to the top of the well section TWS, the distal heights at the bottom HSB and at the top HST cannot be covered by measurements. However, these height segments may be as low as possible taking into consideration what the design of the tool permits.

FIG. 11, FIG. 12 and FIG. 13 are diagrams illustrating typical signals (output capacitance signal CSO) measured by each water level capacitance sensor 41, 42, 43, 44, 45, 46 of the segmented water level capacitance probe 40 and used to implement various embodiments of the water level measurement method of the invention for various inner diameters ID of the hydrocarbon well section 2. Each water level capacitance sensor 41, 42, 43, 44, 45, 46 measures the water level inferred from a corresponding output capacitance signal CSO varying between 0 and 100% in its associated height segment HS1, HS2, HS3, HS4, HS5, HS6, respectively (the signal provided by each sensor is depicted as plain or dotted lines of various types in order to distinguish one signal from another signal). Each water level capacitance sensor 41, 42, 43, 44, 45 and 46 extends substantially vertically along a height segment HS1, HS2, HS3, HS4, HS5 and HS6 such that the segmented water level capacitance probe 40 substantially covers the full height of said section (i.e. the inner diameters ID). In particular, the water level capacitance sensor 41 is positioned such as to measure the water level in the height segment HS1, the water level capacitance sensor 42 is associated to the height segment HS2, the water level capacitance sensor 43 is associated to the height segment HS3, the water level capacitance sensor 44 is associated to the height segment HS4, the water level capacitance sensor 45 is associated to the height segment HS5 and the water level capacitance sensor 46 is associated to the height segment HS6. When the water level is rising in the well section as depicted from FIG. 9 to FIG. 10:

- the first lowest water level capacitance sensor 41 provides an output capacitance signal CSO varying from 0 to 100% in dependency of the height of water along the height segment HS1;
- when the first lowest water level capacitance sensor 41 is fully immersed in water, the output capacitance signal CSO stabilizes and remains at 100%;
- then, the second water level capacitance sensor 42 provides an output capacitance signal CSO varying from 0 to 100% in dependency of the height of water along the height segment HS2;
- when the both the first and second water level capacitance sensors 41 and 42 are fully immersed in water, the output capacitance signals CSO of both sensors stabilize and remain at 100%;
- and so on, until the upper most water level capacitance sensor 46 is reached by the rising water;
- should the full height of the well section be full of water, all the water level capacitance sensor 41, 42, 43, 44, 45, 46 provide output capacitance signals CSO at 100%.

Thus, in the case of a segregated fluid mixture in a highly deviated or substantially horizontal well section, the segmented measurements result in a digital measurement having a better resolution compared to the prior art configuration which only offers a continuous measurement. When water level goes down in the well section (from FIG. 10 to FIG. 9), the reverse sequence of measurements occurs.

The length (height) of the electrode of each water level capacitance sensor 41, 42, 43, 44, 45, 46 may be around 2.0 cm. Typical well horizontal section diameters range from 7.6 cm (i.e. 3 inches) to 22.9 cm (9 inches). Thus, depending on the opening of the deploying arms and the number of water level capacitance sensor, there will be either an optimal measurement coverage, or overlapping measurements, or no measurement in uncovered height segments. The measurement data related to each segment is processed by the main processing module 59 that calculates the water level in the well section based on the particular configuration. The configuration is determined by the main processing module 59 based on the number of water level capacitance sensors 41, 42, 43, 44, 45, 46 mounted on a deploying arm, the height HSi covered by each electrode 50 defined by design and manufacturing constraints, and the opening of the deploying arm provided by the arm opening sensor 60 (used to determine the inner diameter ID of the well section under measurement).

FIG. 11 illustrates a configuration wherein the sum of the height segments HS1, HS2, HS3, HS4, HS5 and HS6 (i.e. the cumulative height) corresponds substantially to the inner diameter ID of the well section being under measurement.

FIG. 12 illustrates another configuration wherein the sum of the height segments HS1, HS2, HS3, HS4, HS5 and HS6 (i.e. the cumulative height) is superior to the inner diameter ID of the well section being under measurement, thus leading to multiple overlapping height segments or overlapping zones OZ. In this configuration, the main processing module 59 calculate a measurement average for height portion where two measurements from adjacent water level capacitance sensors are available in the considered overlapping height segment(s) or overlapping zone(s) OZ.

FIG. 13 illustrates another configuration wherein the sum of the height segments HS1, HS2, HS3, HS4, HS5 and HS6 (i.e. the cumulative height) is inferior to the inner diameter ID of the well section being under measurement, thus leading to multiple unmeasured height segments or white zones WZ. In this configuration, the main processing module 59 calculate an interpolation of the missing measurement(s) between two consecutive height portions where measurements are provided by adjacent water level capacitance sensors in the considered unmeasured height segment(s) or white zone(s) WZ. The interpolation is based on the measurement made at the common boundary of the respective adjacent water level capacitance sensors.

With the production logging tool of the invention, it is possible to achieve:

Segmented measurement of water level in highly deviated and horizontal well sections with a high resolution.

Fluid identification measurements can be focused on area of pipe section with most interest such as phases interfaces for accurate holdups imaging.

Minimal perturbation of flow from tool structure is obtained thanks to the original mechanical structure of the tool.

Interchangeable sensors for maintenance issues.

Robust design allowing deployment in openhole sections.

The production logging tool structure of the invention is simple, compact achieving low cost and easy operation and maintenance.

It should be appreciated that embodiments of the production logging tool according to the present invention are not limited to the embodiment showing horizontal hydrocarbon well bore, the invention being also applicable whatever the configuration of the well bore, namely deviated or a succession of deviated and/or horizontal portions, cased or uncased. Also, the deploying arrangement of the invention is not limited to an application into a production logging tool, but can be easily adapted to various applications into analysis tools operating at downhole pressure and temperature conditions, e.g. a downhole fluid analysis tool, a wireline tool, a formation tester. Despite the fact that the illustrated production logging tool comprises only a unique measuring section, the principle of the invention would be equally applicable to a production logging tool comprises multiple measuring sections coupled together. Further, the segmented water level capacitance probe comprising six water level capacitance sensors, as illustrated, is a non-limitative embodiment, as less of more water level capacitance sensors can be provided depending on the accuracy/resolution level required, the available space along the deploying arm(s), and any other consideration related to the deployment of such downhole tools in specific hydrocarbon wells. Furthermore, the segmented water level capacitance probe is adaptable to different hydrocarbon well diameters, the deploying arm supporting the segmented water level capacitance probe may comprise a series of slots each intended to receive a water level capacitance sensor, the number of slots actually receiving a water level capacitance sensor depending on the diameter of the well to be investigated.

The invention claimed is:

1. A production logging tool for implementing a water level measuring method in a highly deviated or horizontal section of a hydrocarbon well comprising an elongated cylindrical body of longitudinal axis, the body carrying an articulated dual arms deploying arrangement comprising two deploying arms coupled together, to the body and to a sliding sleeve, the deploying arms being operable from a retracted configuration into a vertically extended configuration, wherein:

at least one arm carries a segmented water level capacitance probe comprising multiple water level capacitance sensors sensitive to a water content of a multiphase fluid mixture flowing in a hydrocarbon well;

the water level capacitance sensors are positioned along the arm such as to be positioned at different height from a bottom to a top of a highly deviated or horizontal section of the hydrocarbon well;

each water level capacitance sensor comprising a conductive body forming an electrode covered by a protective cap forming an insulator extending substantially vertically along a height segment such that the segmented water level capacitance probe substantially covers an internal diameter of said section of the hydrocarbon well, and such that a capacitance sensing part axis of the electrode and the insulator is held substantially perpendicular to a well axis by holding said capacitance sensing part axis substantially perpendicular to the longitudinal axis for any opening of the deploying arms from the retracted configuration to the vertically extended configuration in said section of the hydrocarbon well.

2. The production logging tool of claim 1, wherein the articulated dual arms deploying arrangement further comprises a pantographic mechanism coupling each water level capacitance sensor to said, at least one, deploying arm.

3. The production logging tool of claim 1, wherein each water level capacitance sensor further comprises an electronics board fitted within a sheath forming a sealed housing and a first isolated in/out wire connected to said electronics board by a first high pressure electrical feedthrough, the protective cap forming the insulator being coupled in a sealed manner to the sheath through a hollow capacitance sensing part support, the conductive body forming the electrode being internally connected to said electronics board via an internal connection wire.

4. The production logging tool of claim 3, further comprising a modified hollow capacitance sensing part support comprising a T-shaped cavity and coupling to a second high-pressure electrical feedthrough, and a second isolated in/out wire connected to the electronics board by said second high-pressure electrical feedthrough and arranged to connect to an adjacent water level capacitance sensor.

5. The production logging tool of claim 3, wherein the sheath forming the sealed housing, said high pressure electrical feedthrough, and said capacitance sensing part support have a cylindrical shape extending parallelly to the longitudinal axis.

6. The production logging tool of claim 1, wherein the conductive body forming the electrode and the protective cap forming the insulator are coaxial and have a cylindrical shape extending perpendicularly to the longitudinal axis.

7. The production logging tool of claim 1, wherein the multiple water level capacitance sensors are connected together to a main processing module such as to form an array of sensors.

8. The production logging tool of claim 7, wherein the array of sensors forms a star of water level capacitance sensors, or a string of water level capacitance sensors.

9. The production logging tool of claim 1, wherein at least one arm further carries additional sensors comprising phases identification sensors, or local velocity measurements sensors, or a combination of both.

10. A water level measuring method in a highly deviated or horizontal section of a hydrocarbon well comprising the steps of:

providing a production logging tool in the hydrocarbon well, the production logging tool comprising an elongated cylindrical body of longitudinal axis, the body carrying an articulated dual arms deploying arrangement comprising two deploying arms coupled together, to the body and to a sliding sleeve, the deploying arms being operable from a retracted configuration into a vertically extended configuration, wherein:

at least one arm carries a segmented water level capacitance probe comprising multiple water level capacitance sensors sensitive to a water content of a multiphase fluid mixture flowing in the hydrocarbon well;

the water level capacitance sensors are positioned along the arm such as to be positioned at different height from a bottom to a top of the highly deviated or horizontal section of the hydrocarbon well;

each water level capacitance sensor comprising a conductive body forming an electrode covered by a protective cap forming an insulator extending substantially vertically along a height segment;

running the production logging tool along the hydrocarbon well while operating the deploying arms to vertically extend into engagement with a wall of the hydrocarbon well, said articulated dual arms deploying arrangement being configured such that a capacitance sensing part axis of the electrode and the insulator is substantially perpendicular to the well axis for any vertical extension of the deploying arms when running the production logging tool along the hydrocarbon well so that the segmented water level capacitance probe substantially covers an internal diameter of said section of the hydrocarbon well;

determining the water level in said section of the hydrocarbon well based on signals proportional to the capacitance measured by each water level capacitance sensor and related to a local water level along said height segment all along the arm carrying the segmented water level capacitance probe.

11. The water level measuring method of claim 10, further comprising the steps of calculating a water level average for an overlapping height portion where two signals measured from adjacent water level capacitance sensors are available in a corresponding overlapping height segment.

12. The water level measuring method of claim 10, further comprising the steps of calculating a water level interpolation for an uncovered height portion where signals measured from adjacent water level capacitance sensors are unavailable in a corresponding unmeasured height segment.

* * * * *